United States Patent
Bauer

(10) Patent No.: US 9,085,300 B2
(45) Date of Patent: Jul. 21, 2015

(54) METHOD FOR ASCERTAINING A WHEEL CIRCUMFERENCE OF A VEHICLE WHEEL ATTACHED TO A VEHICLE, A PARKING ASSISTANCE SYSTEM, A MOTOR VEHICLE, A COMPUTER PROGRAM AND A COMPUTER-READABLE MEDIUM

(71) Applicant: GM GLOBAL TECHNOLOGY OPERATIONS LLC, Detroit, MI (US)

(72) Inventor: Stefan Bauer, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 14/028,757

(22) Filed: Sep. 17, 2013

(65) Prior Publication Data
US 2014/0088832 A1    Mar. 27, 2014

(30) Foreign Application Priority Data
Sep. 17, 2012 (DE) .................. 10 2012 018 409

(51) Int. Cl.
| | |
|---|---|
| *B60W 30/06* | (2006.01) |
| *G01B 21/00* | (2006.01) |
| *G01B 21/02* | (2006.01) |
| *G01B 21/10* | (2006.01) |
| *G01B 7/12* | (2006.01) |

(52) U.S. Cl.
CPC ............. *B60W 30/06* (2013.01); *G01B 21/00* (2013.01); *G01B 21/02* (2013.01); *G01B 21/10* (2013.01)

(58) Field of Classification Search
CPC ... B60W 30/06; B60W 30/16; B60W 30/095; G01B 7/12; G08G 1/14; G08G 1/16; B60Q 1/48; G01S 15/42; G01S 15/52
USPC ...................... 701/41, 42, 300, 301
See application file for complete search history.

(56) References Cited

U.S. PATENT DOCUMENTS

| | | | | |
|---|---|---|---|---|
| 6,246,226 | B1 * | 6/2001 | Kawase et al. ................ | 324/166 |
| 6,564,123 | B2 * | 5/2003 | Hahn et al. ........................ | 701/1 |
| 6,898,527 | B2 * | 5/2005 | Kimura et al. ................ | 701/301 |
| 8,229,610 | B2 * | 7/2012 | Harumoto et al. .............. | 701/22 |

(Continued)

FOREIGN PATENT DOCUMENTS

| | | |
|---|---|---|
| DE | 102005052476 A1 | 5/2007 |
| DE | 102006060456 A1 | 8/2007 |

(Continued)

*Primary Examiner* — Tan Q Nguyen

(74) *Attorney, Agent, or Firm* — Ingrassia Fisher & Lorenz PC

(57) ABSTRACT

A method is provided for ascertaining a wheel circumference of a vehicle wheel attached to a vehicle with reference to the distance travelled by the vehicle and measuring signals of a wheel revolution sensor associated with a vehicle wheel. The method includes, but is not limited to positioning the vehicle in front of a stationary obstacle and registering the obstacle with a distance measuring device of the vehicle, moving the vehicle in direction of the obstacle, ascertaining the distance travelled as the reference distance with the distance measuring device, ascertaining the number of measuring pulses of the wheel sensor over the distance travelled, and determining the wheel circumference from the ascertained distance and the ascertained number of measuring pulses of the wheel sensor. A parking assistance system is also provided for a motor vehicle, a motor vehicle, a computer program product and a computer program.

18 Claims, 2 Drawing Sheets

(56) References Cited

U.S. PATENT DOCUMENTS

| | | | |
|---|---|---|---|
| 2002/0041239 A1* | 4/2002 | Shimizu et al. | 340/932.2 |
| 2004/0010365 A1* | 1/2004 | Duckeck | 701/201 |
| 2004/0143376 A1* | 7/2004 | Rosseau | 701/29 |
| 2009/0071227 A1 | 3/2009 | Schmid et al. | |
| 2011/0022269 A1* | 1/2011 | Nakazono et al. | 701/41 |
| 2011/0267924 A1* | 11/2011 | Horsky et al. | 367/99 |

FOREIGN PATENT DOCUMENTS

| | | |
|---|---|---|
| DE | 102006060457 A1 | 8/2007 |
| DE | 102009058544 A1 | 7/2010 |

* cited by examiner

METHOD FOR ASCERTAINING A WHEEL CIRCUMFERENCE OF A VEHICLE WHEEL ATTACHED TO A VEHICLE, A PARKING ASSISTANCE SYSTEM, A MOTOR VEHICLE, A COMPUTER PROGRAM AND A COMPUTER-READABLE MEDIUM

CROSS-REFERENCE TO RELATED APPLICATION

This application claims priority to German Patent Application No. 10 2012 018 409.3, filed Sep. 17, 2012, which is incorporated herein by reference in its entirety.

TECHNICAL FIELD

The technical field relates to a method for ascertaining a wheel circumference of a vehicle wheel attached to a vehicle, and also relates to a parking assistance system of a motor vehicle, a motor vehicle, a computer program product and a computer program.

BACKGROUND

The tire diameter of the vehicle wheel is needed to ascertain the vehicle speed and/or the distance that a vehicle has travelled. The respective information on the tire diameter is stored in at least one control device. This value can be utilized in conjunction with a value indicating the wheel revolutions and supplied by a wheel revolution sensor to calculate the value for the vehicle speed and/or the value for the distance the vehicle has travelled. This value for the vehicle speed or the distance travelled is used by vehicle systems such as automatic or semi-automatic parking assistants, in order to calculate the position of the vehicle at any point in time and to calculate the distance required for the parking manoeuver. Any error regarding the tire diameter therefore results in an error when determining the vehicle position or the distance travelled.

When changing from summer tires to winter tires or vice versa considerable differences may occur regarding the tire diameter. Therefore the tire diameter must be regularly calibrated. Normally the tire diameter or the tire circumference is measured and the measured value is directly programmed into the corresponding control device. The circumference of the tire calculated on this basis does, however, not normally indicate the actual tire circumference of the assembled vehicle wheel.

A method for calibrating the wheel diameter or the wheel circumference is described in the DE 10 2005 054 141 A1. Accordingly a reference distance is travelled and the wheel rotations required for this are set in relation to the distance travelled for calculating therefrom the wheel diameter or the wheel circumference. Similarly it is known from the DE 10 2005 052 476 A1 to determine the wheel circumference from the signals of a wheel revolution sensor and a reference distance. In here it is proposed to determine the reference distance from the positions ascertained by the GPS system of a navigation system.

Now, in order to determine the wheel circumference or the wheel diameter using these methods, a relatively high accuracy is preferable when determining the reference distance, which causes corresponding systems to always be complicated and thus cost-intensive.

Against this background it is at least one objective to provide a method for ascertaining the wheel circumference, which delivers high accuracy when ascertaining the reference distance for determining the wheel circumference or the wheel diameter. In addition, other objects, desirable features and characteristics will become apparent from the subsequent summary and detailed description, and the appended claims, taken in conjunction with the accompanying drawings and this background.

Accordingly there is provided a method for ascertaining a wheel circumference of at least one vehicle wheel attached to a vehicle with a reference distance travelled by the vehicle and with the measuring signals of a wheel revolution sensor associated with the vehicle wheel, comprising the following consecutively executed steps: positioning the vehicle in front of a stationary obstacle with a distance measuring device of the vehicle, moving the vehicle in direction of the obstacle, ascertaining the distance travelled as the reference distance with the distance measuring device, ascertaining the number of measuring pulses of the wheel sensor over the distance travelled, determining the wheel circumference from the ascertained distance and the ascertained number of measuring pulses of the wheel sensor.

A parking assistance system of a motor vehicle with a control device, distance sensors and wheel revolution sensors respectively associated with the vehicle wheels of the vehicle for performing a method according to an embodiment. A motor vehicle with a parking assistance system according to an embodiment. A computer program comprising instructions causing the program-controlled device to execute a method according to an embodiment. A computer-readable medium comprising a computer program according to an embodiment.

At least one of the embodiments is based on the knowledge that the reference distance required for calculating the wheel circumference can be ascertained with a great deal of accuracy. If this variable is utilized for calculating the wheel circumference, this will also lead to an accurate value for the calculated wheel circumference, as a result of which assistance systems of the vehicle utilizing this value of the wheel circumference can reliably operate with a high degree of quality. Advantageous embodiments and further developments are the subject of the sub-claims and of the description with reference to the figures.

With an advantageous design of the embodiments provision is made for a wheel revolution sensor to be associated with each vehicle wheel and for method step to be performed for each vehicle wheel. Preferably the measuring pulses determined for each vehicle wheel are then used in method step to ascertain the wheel circumference of the vehicle wheels. This offers the advantage of individually determining the circumference of each wheel and to evaluate these values as regards further tire parameters such as tire pressure.

It is particularly advantageous if in the further embodiment a mean wheel circumference is determined from the ascertained wheel circumferences of the vehicle wheels. This value can be used by vehicle systems such as a parking assistance system to improve the result and which according to an advantageous further development of the invention comprises a distance measuring device. Initially the parking assistance system is placed into a learning mode in order to perform the method according to an embodiment.

In one embodiment provision is made for a factor to be determined during determination of the wheel circumference which factor characterizes the relationship between the determined wheel circumference and the stored wheel circumference. Using this calculated factor a plurality of vehicle systems can very easily calculate the newly determined wheel circumference and utilize it for its further operation.

The above embodiments and further developments can be combined in any given meaningful way. Further possible arrangements, further developments and implementations of the invention also comprise not explicitly mentioned combinations of previously or subsequently mentioned features in relation to the embodiments. In particular the expert will add individual aspects as improvements or amendments to the respective basic design.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
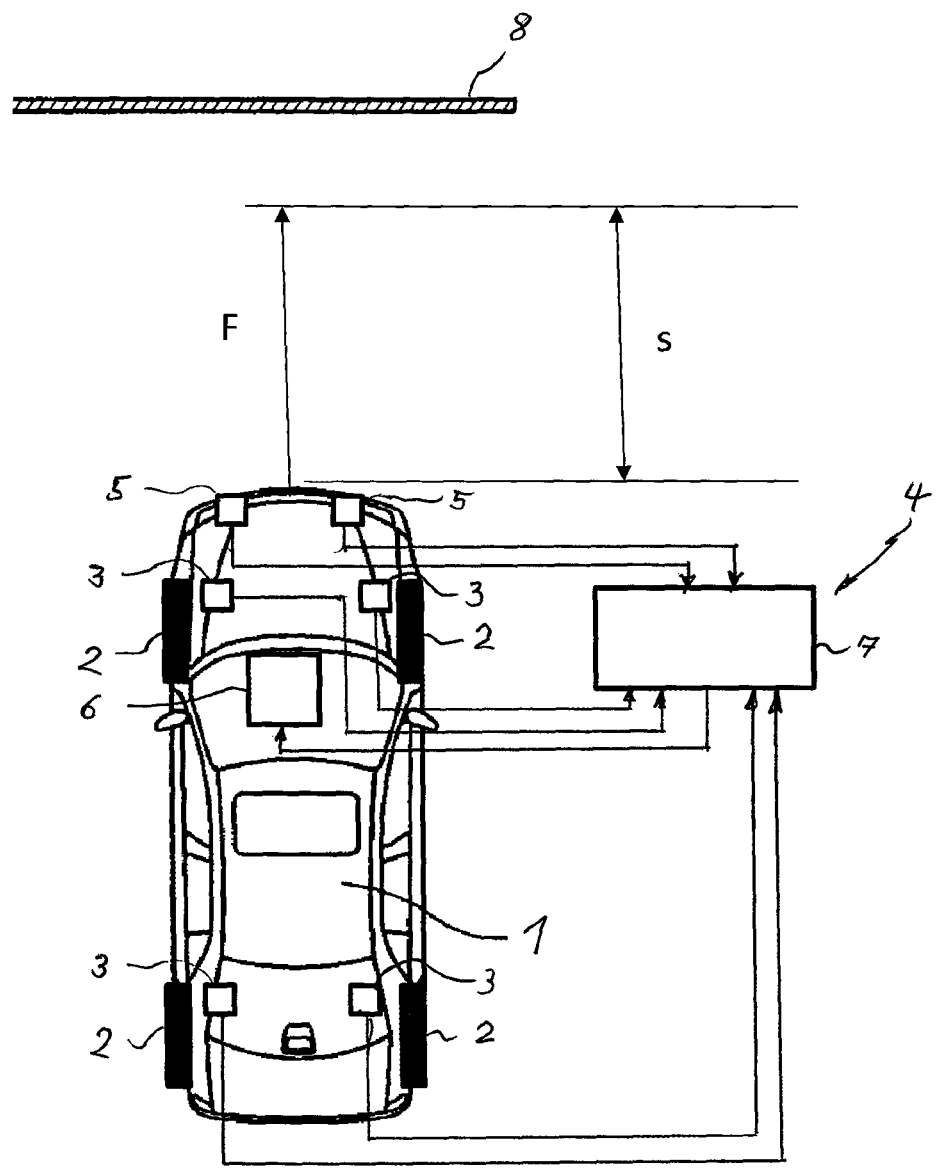
FIG. 1 shows a schematic drawing of a vehicle standing in front of an obstacle for explaining the method according to an embodiment.
Figure 2:
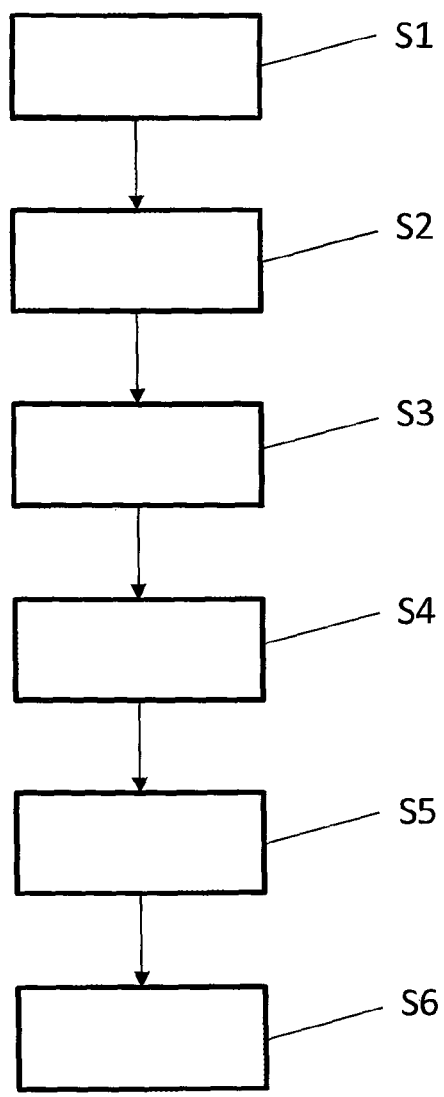
FIG. 2 shows a flow diagram as an embodiment of the method.

FIG. 1 shows a drawing of a vehicle standing in front of an obstacle for explaining the method according to an embodiment. The motor vehicle 1 of FIG. 1 with four vehicle wheels 2 that each have a wheel revolution sensor 3 assigned to them includes a parking assistance system 4 with a control device 7 to which are fed the measuring pulses as measuring signals of the wheel revolution sensors 3. For distance measuring the parking assistance system 4 comprises a distance measuring device with distance sensors 5, which are arranged at the front bumper of the vehicle 1 and which may, for example, represent ultrasound sensors. The control device 7 is connected with a display 6 of the motor vehicle 1, on which are displayed hints regarding the steering angle as well as stopping and repositioning points, provided the vehicle 1 is equipped with a semi-automatic parking assistance system 4. Alternatively the vehicle 1 may comprise an automatic parking assistance system 4 which automatically performs the steering maneuver into the park position of the motor vehicle 1. In order to ascertain the wheel circumference of individual vehicle wheels 2, for example following a tire change, the method steps shown in the flow diagram of FIG. 2 are performed.

According to method step S1 the parking assistance system 4 is initially placed into a learning mode by the driver. Subsequently the motor vehicle 1 is placed in front of an obstacle such as a wall 8 as shown in FIG. 1, so that the distance sensors 5 are able to register the obstacle 8 (method step S2). The motor vehicle 1 is then driven by the driver for a distance s in direction F of the obstacle 8 (method step S3). This distance s is ascertained by the parking assistance system 4 in method step S4 while at the same time the measuring pulses of the wheel revolution sensor 3 generated over this distance are recorded. For each revolution of the vehicle wheel at least one measuring pulse is generated by the associated wheel revolution sensor 3.

Using these variables, i.e., the ascertained distance s and the number of measuring pulses generated by the wheel revolution sensors 3, the driving path per wheel revolution, i.e., the wheel circumference of each of the vehicle wheels 2, is calculated in method step S5. Since the distance s travelled is ascertained by means of the distance measuring device 5 with a great deal of accuracy, the ascertained value of the wheel circumference is also highly accurate.

If for example it is known that a wheel revolution sensor 3 generates 20 measuring pulses for a full revolution at a wheel of the vehicle, the wheel circumference can be calculated according to the following formula: Circumference=20/(number of measuring pulses)*(measured distance). Therefore, if a distance of 80 cm is measured and 10 pulses are recorded, the resulting wheel circumference is: Circumference=20/10*80 cm=160 cm. The calculation can be very easily adapted for different wheel revolution sensors 3. All that is necessary is to replace the number 20 by the number of measuring pulses generated by a sensor for a full revolution of the respective wheel.

This wheel circumference value is stored as a tire parameter in a memory of the control device 7 of the parking assistance system 4 and is available as part of the parking assistance system function (method step S6). Since e.g., following a tire change the tire size will be correct the quality of the parking maneuver, in particular if parking is affected automatically, is markedly improved with the method.

The wheel circumference calculated by the described method can of course be made available not only to a parking assistance system, but can also be used by any vehicle function or by driver assistance systems that need the actual wheel circumference of the vehicle wheels for the functions to be performed. In a further embodiment, a factor may be calculated in place of a new wheel circumference that indicates the ratio between a stored wheel circumference and the new wheel circumference. To this end two distances are measured. One distance corresponds to the distance travelled that was recorded with the aid of the distance measuring device 5. The second distance corresponds to that distance which was measured by the wheel revolution sensors 3. If, for example, the distance measuring device 5 measures a distance of 85 cm and the wheel revolution sensors 3 measures a distance of 90 cm, the resulting factor is 85 cm/90 cm=0.944. This factor can then be utilized by those systems in the vehicle which carry out calculations based on the tire circumference and which have stored the original value for the tire circumference.

Although the embodiments have been described above in detail with reference to preferred embodiments, it is not limited thereto and can be modified in many different ways. In one embodiment the computer-readable medium is configured as a CD, a DVD, a hard disc, and a USB memory or such like. The following further embodiments are e.g. possible: A device for ascertaining a wheel circumference of at least one vehicle wheel attached to a vehicle by means of a reference distance travelled by the vehicle and measuring signals of a wheel revolution sensor associated with the vehicle wheel, comprising a positioning device for positioning the vehicle in front of a stationary obstacle and registering the obstacle with a distance measuring device of the vehicle. Comprising a moving device for moving the vehicle in direction of the obstacle. Comprising an ascertaining device for ascertaining the distance travelled as the reference distance with the distance measuring device. Comprising an ascertaining device for ascertaining the number of measuring pulses of a wheel sensor via the distance travelled. Comprising a determining device for determining the wheel circumference from the distance ascertained and the ascertained number of measuring pulses of the wheel sensor.

A device according with a wheel revolution sensor is assigned to each vehicle wheel of the vehicle and in that ascertaining the number of measuring pulses for each vehicle wheel ascertain the measuring pulses of the wheel sensor over the distance travelled and in that determining from the measuring pulses ascertained for each vehicle wheel ascertain the wheel circumference of each vehicle wheel, respectively. A Device for determining a mean wheel circumference from the ascertained wheel circumferences of the vehicle wheels of the vehicle. A device ascertaining the distance travelled are configured as a distance measuring device of a parking assistance system of the vehicle and are used for registering the obstacle and for ascertaining the distance travelled. A device placing the parking assistance system for performing the method into a learning mode.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for ascertaining a wheel circumference of a vehicle wheel attached to a vehicle, comprising:
    positioning the vehicle in front of an obstacle and registering the obstacle with a distance measuring device of the vehicle;
    moving the vehicle in a direction of the obstacle;
    ascertaining a travelled distance as a reference distance with the distance measuring device;
    ascertaining a number of measuring pulses of the wheel sensor over the travelled distance; and
    determining the wheel circumference from the reference distance and the number of measuring pulses of the wheel sensor.

2. The method according to claim 1, wherein each vehicle wheel of the vehicle is associated with a wheel revolution sensor and said ascertaining the travelled distance as the reference distance is performed for each vehicle wheel and the wheel circumference of each vehicle wheel is ascertained respectively from the number of measuring pulses ascertained for each vehicle wheel in accordance with the determining the wheel circumference from the reference distance and the number of measuring pulses of the wheel sensor.

3. The method according to claim 2, further comprising determining a mean wheel circumference from the wheel circumference of each vehicle wheel of the vehicle.

4. The method according to claim 1, further registering the obstacle with the distance measuring device of a parking assistance system of the vehicle and ascertaining the travelled distance.

5. The method according to claim 4, wherein placing the parking assistance system into a learning mode.

6. The method according to claim 1, further comprising determining a factor during the determining the wheel circumference, the factor characterizing a ratio between the wheel circumference and a stored wheel circumference.

7. A parking assistance system of a vehicle, comprising:
    a distance measuring device of the vehicle that is configured for positioning in front of a stationary obstacle and registering an obstacle;
    ascertaining a travelled distance as a reference distance with the distance measuring device with a movement of the vehicle in a direction of the obstacle;
    a wheel sensor configured to ascertain a number of measuring pulses of the wheel sensor over the travelled distance; and
    a control device that is configured to determine a wheel circumference from the reference distance and the number of measuring pulses of the wheel sensor.

8. The parking assistance system according to claim 7, wherein each vehicle wheel of the vehicle is associated with a wheel revolution sensor and ascertaining the travelled distance as the reference distance is performed for each vehicle wheel and the wheel circumference of each vehicle wheel is ascertained respectively from the number of measuring pulses ascertained for each vehicle wheel in accordance with the determining the wheel circumference from the reference distance and the number of measuring pulses of the wheel sensor.

9. The parking assistance system according to claim 8, wherein the control device is further configured to determine a mean wheel circumference from the wheel circumference of each vehicle wheel of the vehicle.

10. The parking assistance system according to claim 7, further registering the obstacle with the distance measuring device of the parking assistance system of the vehicle and ascertaining the travelled distance.

11. The parking assistance system according to claim 7, wherein the control device is configured to operate in a learning mode.

12. The parking assistance system according to claim 7, wherein the control device is further configured to determine a factor during the determining the wheel circumference, the factor characterizing a ratio between the wheel circumference and a stored wheel circumference.

13. A non-transitory computer readable medium embodying a computer program product, said computer program product comprising:
    an ascertaining program for ascertaining a wheel circumference of a vehicle wheel attached to a vehicle, the ascertaining program configured to:
    register an obstacle of the vehicle in front of a stationary obstacle identified by a distance measuring device of the vehicle;
    ascertain a travelled distance with a movement of the vehicle as a reference distance with the distance measuring device;
    ascertain a number of measuring pulses of the wheel sensor over the travelled distance; and
    determine the wheel circumference from the reference distance and the number of measuring pulses of the wheel sensor.

14. The non-transitory computer readable medium embodying the computer program product according to claim 13, wherein each vehicle wheel of the vehicle is associated with a wheel revolution sensor and said ascertaining program is configured to ascertain the travelled distance as the reference distance is performed for each vehicle wheel and the wheel circumference of each vehicle wheel is ascertained respectively from the number of measuring pulses ascertained for each vehicle wheel in accordance with the determining the wheel circumference from the reference distance and the number of measuring pulses of the wheel sensor.

15. The non-transitory computer readable medium embodying the computer program product according to claim 14, wherein the ascertaining program is further configured to determine a mean wheel circumference from the wheel circumference of each vehicle wheel of the vehicle.

16. The non-transitory computer readable medium embodying the computer program product according to claim

13, wherein the ascertaining program is further configured to register the obstacle with the distance measuring device of a parking assistance system of the vehicle and ascertaining the travelled distance.

17. The non-transitory computer readable medium embodying the computer program product according to claim 13, wherein the ascertaining program operates in a learning mode.

18. The non-transitory computer readable medium embodying a computer program product according to claim 13, wherein the ascertaining program is further configured to determine a factor during the determining the wheel circumference, the factor characterizing a ratio between the wheel circumference and a stored wheel circumference.

* * * * *